United States Patent
Fontaine et al.

(10) Patent No.: US 10,440,551 B2
(45) Date of Patent: Oct. 8, 2019

(54) TECHNIQUE FOR DETERMINING THE PRESENCE OF A PERIPHERAL DEVICE IN A SERVICE AREA OF A LOCAL NETWORK

(71) Applicant: ORANGE, Paris (FR)

(72) Inventors: Fabrice Fontaine, Geveze (FR); Han Yan, Puteaux (FR)

(73) Assignee: Orange, Paris (FR)

( * ) Notice: Subject to any disclaimer, the term of this patent is extended or adjusted under 35 U.S.C. 154(b) by 26 days.

(21) Appl. No.: 15/511,202

(22) PCT Filed: Sep. 29, 2015

(86) PCT No.: PCT/FR2015/052595
§ 371 (c)(1),
(2) Date: Mar. 14, 2017

(87) PCT Pub. No.: WO2016/051073
PCT Pub. Date: Apr. 7, 2016

(65) Prior Publication Data
US 2017/0245133 A1     Aug. 24, 2017

(30) Foreign Application Priority Data
Sep. 30, 2014  (FR) .................................. 14 59283

(51) Int. Cl.
*H04B 7/155* (2006.01)
*H04W 48/08* (2009.01)
(Continued)

(52) U.S. Cl.
CPC ........ *H04W 8/005* (2013.01); *H04B 7/15528* (2013.01); *H04L 12/282* (2013.01);
(Continued)

(58) Field of Classification Search
CPC ....... H04W 8/005; H04W 4/80; H04W 48/08; H04W 52/0212; H04W 4/21;
(Continued)

(56) References Cited

U.S. PATENT DOCUMENTS 5,983,072 A * 11/1999 Schroderus ........... H04W 84/08
455/11.1
6,785,511 B1 * 8/2004 Hengeveld ........... H04B 7/2606
455/16
(Continued)

FOREIGN PATENT DOCUMENTS

WO         2013086036 A1     6/2013

OTHER PUBLICATIONS

Attached please find written opinion for the PCT/FR2015/052595 application.

*Primary Examiner* — Un C Cho
*Assistant Examiner* — Lalita W Pace
(74) *Attorney, Agent, or Firm* — Haverstock & Owens LLP

(57) ABSTRACT

The invention relates to a technique for determining the presence of a peripheral device (23, 26) in a service area of a local network (2). The local network includes a gateway (20) for accessing a communications network (1) and at least one relay device (21, 24). The peripheral device and the relay device(s) are arranged to communicate with other devices via a radio-access network. The access gateway controls at least one relay device, so that the latter scans frequencies for accessing the radio-access network. When the relay device receives an announcement message from the peripheral device, said relay device transmits a notification of detection of the peripheral device to the access gateway. The peripheral device is then identified as being present in the service area.

18 Claims, 3 Drawing Sheets

(51) Int. Cl.

| | | |
|---|---|---|
| *H04L 12/28* | (2006.01) | |
| *H04W 88/04* | (2009.01) | |
| *H04W 48/16* | (2009.01) | |
| *H04W 4/80* | (2018.01) | |
| *H04W 8/00* | (2009.01) | |
| *H04W 4/21* | (2018.01) | |
| *H04W 84/12* | (2009.01) | |
| *H04W 88/16* | (2009.01) | |

(52) U.S. Cl.
CPC ........ *H04L 12/283* (2013.01); *H04L 12/2803* (2013.01); *H04L 12/2809* (2013.01); *H04L 12/2814* (2013.01); *H04L 12/2825* (2013.01); *H04L 12/2829* (2013.01); *H04W 4/21* (2018.02); *H04W 4/80* (2018.02); *H04W 48/08* (2013.01); *H04W 48/16* (2013.01); *H04W 84/12* (2013.01); *H04W 88/04* (2013.01); *H04W 88/16* (2013.01)

(58) Field of Classification Search
CPC ..... H04W 48/16; H04W 88/04; H04W 84/12; H04W 88/16; H04L 12/2803; H04L 12/2809; H04L 12/2825; H04L 12/282; H04L 12/2814; H04L 12/283; H04B 7/15528
USPC ........................................ 455/434, 11.1–13.1

See application file for complete search history.

(56) References Cited

U.S. PATENT DOCUMENTS

| | | | |
|---|---|---|---|
| 9,301,329 B2 * | 3/2016 | Lim | H04W 76/15 |
| 2006/0056369 A1 | 3/2006 | Morishige et al. | |
| 2008/0031197 A1 * | 2/2008 | Wang | H04B 7/15542 |
| | | | 370/331 |
| 2010/0315225 A1 * | 12/2010 | Teague | A61B 5/0024 |
| | | | 340/539.12 |
| 2011/0066756 A1 | 3/2011 | Kakumaru | |
| 2011/0216662 A1 * | 9/2011 | Nie | H04W 24/00 |
| | | | 370/252 |
| 2012/0185268 A1 * | 7/2012 | Wiesner | G06F 19/3418 |
| | | | 705/2 |
| 2013/0029589 A1 * | 1/2013 | Bontu | H04W 16/14 |
| | | | 455/7 |
| 2013/0109375 A1 * | 5/2013 | Zeiler | H04W 4/029 |
| | | | 455/426.1 |
| 2013/0202068 A1 * | 8/2013 | Ly-Gagnon | H04W 52/0225 |
| | | | 375/343 |
| 2013/0262654 A1 | 10/2013 | Masli et al. | |
| 2014/0188348 A1 * | 7/2014 | Gautama | B60W 10/30 |
| | | | 701/48 |
| 2015/0023245 A1 * | 1/2015 | Du | H04W 28/0205 |
| | | | 370/315 |
| 2015/0172387 A1 * | 6/2015 | Ge | H04W 4/70 |
| | | | 370/254 |
| 2015/0244448 A1 * | 8/2015 | Seok | H04W 48/12 |
| | | | 370/315 |
| 2015/0365217 A1 * | 12/2015 | Scholten | H04L 5/0053 |
| | | | 370/315 |
| 2016/0065270 A1 * | 3/2016 | Chung | H04B 5/0062 |
| | | | 340/10.3 |
| 2016/0286483 A1 * | 9/2016 | Bergstrom | H04W 48/18 |

* cited by examiner

TECHNIQUE FOR DETERMINING THE PRESENCE OF A PERIPHERAL DEVICE IN A SERVICE AREA OF A LOCAL NETWORK

The invention pertains to the general field of telecommunications.

The invention relates more particularly to a technique for determining a presence of a peripheral device in a service area of a local area network.

A residential network comprises equipment or devices located in a customer site. These devices are also called CPE, for "Customer Premise Equipment". For a local area network, these are in particular an access gateway, a "Set-Top-Box" TV decoder, a mobile terminal. In the context of a home-automation network, these are also household appliances, alarm systems, sensors. The access gateway enables the devices of the residential network to access a WAN wide area communication network, such as the Internet network.

These devices are for example mobile terminals, such as "smartphone" intelligent terminals or tablets. Once connected to an access point, they can thus receive data originating from the other devices of the local area network or else from devices connected to the wide area communication network and dispatch data destined for a device of the local area network or connected to the wide area communication network.

An ever increasing number of connected objects, such as bracelets, watches, weighing scales, weather sensors, are also being offered to the public. These connected objects make it possible for example to collect data for a user or else for an environment. In order to limit the energy consumption of these connected objects, a low-consumption wireless network is used to transmit the collected data to a device endowed with processing capabilities. This is for example a BLE, for "Bluetooth Low Energy", technology radio access network.

The protocol implemented in a BLE access network operates in 2 phases:
  an advertisement phase where a BLE device of "peripheral" type, for example the connected object, regularly advertises its presence on the BLE access network by way of a frame "LE Advertising Report" which comprises in particular its BLE MAC address, its name and a power level of a received RSSI (for "Received Signal Strength Indication") radio signal;
  a GATT (for "Generic Attribute Profile") connection phase where a BLE device of "central" type connects to the peripheral device to collect more detailed information such as the name of the manufacturer, the level of the battery.

These connected objects are thus detected by a "central" or master BLE device. The latter can connect to the connected objects to collect their data (heart rate, number of steps performed, etc.). Thereafter, the master BLE device may optionally transmit this information by way of the Internet network to servers or else storage areas. This master BLE device is for example an intelligent telephone ("smartphone" in English).

The radio range for this type of access network is very limited, of the order of about ten meters for example inside a residence. The master BLE device must thus be situated in proximity to the "peripheral" BLE device in order to be able to detect the latter. However, when the master BLE device, for example the intelligent telephone, moves further away from the peripheral BLE device or indeed even exits the environment of the local area network, it is no longer possible to obtain information as regards the presence of the peripheral BLE device in the environment of the local area network.

One of the aims of the invention is to remedy inadequacies/drawbacks of the prior art and/or to afford improvements thereto.

According to a first aspect, the subject of the invention is a method for determining a presence of a peripheral device in a service area of a local area network, said local area network comprising an access gateway to a communication network and at least one relay device, said peripheral device and the at least one relay device being able to communicate with other devices by way of a radio access network. The method comprises the following steps implemented by the gateway:
  command of at least one of the relay devices, said command requesting an execution of a listening for access frequencies of the radio access network;
  reception from said at least one relay device of a notification of detection of the peripheral device, sent by the relay device subsequent to a reception (F4) of an advertisement message originating from the peripheral device, said peripheral device then being identified as present in the service area.

By virtue of the method, the access gateway of the local area network enables devices of the local area network or else devices outside this network to obtain information on the presence or otherwise of peripheral devices in a service area of the local area network. These peripheral devices are simple devices, having only a low-consumption radio access module for communicating. The radio access technology complies for example with the "Bluetooth Low Energy" technology. The peripheral devices are for example sensors and are generally detectable only on the basis of a master device situated in their vicinity. By virtue of the implementation of the method, they are thus integrated into the topology of the local area network and visible to any device accessing the local area network.

Their presence or their absence makes it possible in particular to deduce therefrom a presence or an absence of a user or else of the central device with which the peripheral device is generally associated.

No modification is required at the level of the peripheral devices.

The relay devices are connected to the local area network, more precisely directly or indirectly to the access gateway. This involves for example electrical plugs with an Ethernet connection and/or PLC (for "Power Line Carrier") connection and a radio access module of the same technology as the peripheral devices.

The implementation of the listening for frequencies is controlled by the access gateway. This makes it possible to limit the energy consumption of the relay device.

When the geographical location of the relay device is known, it is thus possible to approximately locate the peripheral device in the service area.

The various embodiments or characteristics mentioned hereinafter can be added independently or in combination with one another, in the steps of the above-defined determining method.

In a particular embodiment, the method furthermore comprises a command to activate a radio access module of said relay device prior to the dispatching of the listening command and a command to deactivate said module once listening has terminated.

Between two phases of listening for frequencies, the radio access module is disabled, that is to say on standby or turned off. This makes it possible to limit the energy consumption of the relay devices.

In a particular embodiment, the advertisement message received by the relay device comprises a data item which is representative of a radio signal received from the relay device and which is dispatched to the gateway in association with the detection data item.

By analyzing the data item representative of the radio signal received, it is possible to locate the peripheral device more finely in the service area.

In a particular embodiment, the advertisement message received by the relay device furthermore comprises an address in the local area network identifying a master device controlling the peripheral device.

Thus, it is also possible to detect the presence in the service area of the local area network of another device playing a role of master in relation to the peripheral device.

In a particular embodiment, the method comprises, following a detection of the presence of the peripheral device in the service area, a step of executing an action in the local area network.

As a function of the detection of the presence of the peripheral device, the access gateway can itself execute an action or else command the execution of an action by another device of the local area network. By way of illustrative examples, the action corresponds to bringing into operation a WiFi radio access module of the access gateway, to bringing into operation or placing out of operation the TV decoder, etc. The action can also be triggered as a function of the relay device which has detected the presence of the peripheral device.

Advantageously, the advertisement message received by the relay device furthermore comprises an address in the local area network identifying a master device controlling the peripheral device and the action corresponds to an activation of a second radio access module of the relay device, so as to establish a connection with the master device.

As a function of the detection of the presence of the master device, the access gateway can itself execute an action or else command the execution of an action by another device of the local area network.

In a particular embodiment, the method furthermore comprises a step of obtaining a value of a characteristic managed by the peripheral device present.

According to a second aspect, the invention also relates to an access gateway enabling at least one device of a local area network to access a communication network and designed to cooperate with a relay device belonging to the local area network so as to determine a presence of a peripheral device in a service area of the local area network, said gateway comprising:
- a command module for at least one relay device, designed to command the relay device to execute a listening for access frequencies of a radio access network;
- a receive module, designed to receive from said at least one relay device a notification of detection of the peripheral device, sent by the relay device following reception of an advertisement message originating from the peripheral device, said peripheral device then being identified as present in the service area of the local area network.

The advantages stated in respect of the method for determining a presence according to the first aspect are transposable directly to the access gateway.

According to a third aspect, the invention also relates to a relay device in a local area network, designed to cooperate with an access gateway enabling the devices of the local area network to access a communication network so as to determine a presence of a peripheral device in a service area of a local area network, said relay device comprising:
- a receive module, designed to receive from the access gateway a command to execute a listening for access frequencies of a radio access network;
- a radio access module, designed to execute a listening for access frequencies of the radio access network and to receive an advertisement message originating from the peripheral device;
- a send module, designed to dispatch to the access gateway a notification of detection of the peripheral device following reception of the advertisement message.

The advantages stated in respect of the method for determining a presence according to the first aspect are transposable directly to the relay device.

According to a fourth aspect, the invention also relates to a system for determining a presence of a peripheral device in a service area of a local area network, said local area network comprising an access gateway according to the second aspect and at least one relay device according to the third aspect.

The advantages stated in respect of the method for determining a presence according to the first aspect are transposable directly to the system.

According to a fifth aspect, the invention relates to a program for an access gateway, comprising program code instructions intended to control the execution of the steps of the method for determining a presence according to the first aspect, when this program is executed by the access gateway and a recording medium readable by an access gateway and on which a program for a gateway is recorded.

The advantages stated in respect of the method for determining a presence according to the first aspect are transposable directly to the program for an access gateway and to the recording medium.

The invention will be better understood with the aid of the following description of particular embodiments of the technique for determining a presence, with reference to the appended drawings in which.

Figure 1:
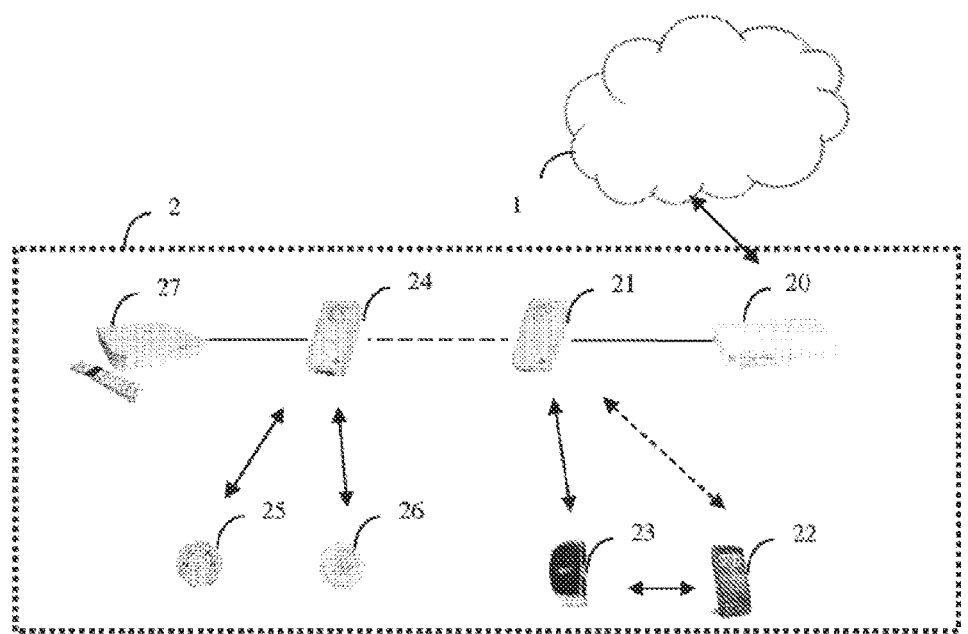
FIG. 1 represents an environment in which the technique for determining a presence is implemented.

FIG. 1 represents, in its environment, a private or residential local communication network 2. An access gateway 20 enables devices of the local area network 2 to access a wide area communication network 1 or WAN, such as the Internet network.

The local area network relies on diverse network technologies, such as a wired network of Ethernet type according to IEEE standard 802.3, a wireless network of Wi-Fi type according to IEEE standard 802.11 or else a PLC power line carrier network (for example HomePlug®, Alliance HD- PLC) according to IEEE standard 1901, or else a network for coaxial cable of MoCA®, for "Multimedia over Coax", type.

The devices of the local area network 2 can be any devices, for example domestic, having a wired or wireless network connection. They may involve for example a mobile telephone 22, PLC plugs 21, 24, a TV decoder 27 ("Set-Top Box"), a games console (not represented).

Such as represented in FIG. 1, the gateway 20 is connected by an Ethernet wired link according to IEEE standard 802.3 to the PLC plug 21. The latter communicates with the PLC plug 24 by means of a technology using power line carriers. This technology complies for example with IEEE specification 1901-2010, entitled "IEEE Std 1901-2010, IEEE Standard for Broadband over Power Line Networks: Medium Access Control and Physical Layer Specifications". At the network level, the exchanges between the access gateway 20 and the PLC plugs 21, 24 comply with the UPnP, for "Universal Plug and Play", network protocol promulgated by the UPnP forum. The aim of the UPnP standard is to enable devices to connect conveniently and to communicate simply within such a network. It constitutes a set of communication protocols based on the IP protocol (Internet Protocol, the basic protocol for networks of Internet type). To control the devices of the network, the UPnP protocol uses control points. In the embodiment described, the access gateway 20 is a control point of the local area network. A control point conventionally sends so-called discovery messages to the various devices of the local area network so as to obtain in return a description of the devices corresponding to the enquiry. These discovery messages are usually sent in point to multipoint mode of communication, also called multicast, from the control point to the devices. A terminal device compatible with the UPnP standard responds to these enquiry messages, and sends moreover, with regular frequency, presence messages to signify that it is active and connected to the network.

The TV decoder 27 is for its part connected to the PLC plug 24 by an Ethernet wired link and thus accesses the local area network. Once connected, the devices of the local area network can access the wide area communication network 1 by way of the access gateway 20.

A service area of the local area network corresponds to a geographical area in which the devices of the local area network can communicate directly or indirectly with the access gateway 20. This service area corresponds for example to a building of a user's home residence. PLC plugs are disposed for example in each room of the residence.

In a service area of the local area network, other devices, termed peripheral devices, are also present. They are for example a smoke detector 25, household appliances (not represented), a sensor 26, a connected watch 23. These various peripheral devices are designed to communicate on a first radio access network and each comprise a radio access module.

The first radio access module is of low-consumption radio type according to a first access technology, such as Bluetooth® Low Energy BLE. This BLE access technology is defined by a Bluetooth SIG standardization group in the form of a set of documents, named "Bluetooth Core Specification 4.1".

In the embodiment described, the PLC plugs 21, 24 are also designed to communicate on the first radio access network and each comprise a first radio access module of low-consumption type according to the first BLE access technology. These PLC plugs play a role of relay in relation to the access gateway during the implementation of the method described subsequently. These PLC plugs are thus also called relay devices.

The smoke detector 25 and the sensor 26 are situated in an area of radio coverage of the PLC plug 24. The connected watch 23 is situated in an area of radio coverage of the PLC plug 21. The size of these coverage areas depends on the radio technology used and on the environment. For a BLE technology, these coverage areas are of the order of about ten meters.

In a particular embodiment, the first radio access modules of the PLC plugs 21, 24 are activatable and deactivatable remotely by the access gateway 20. An activation state is associated with each first radio access module and can take an "activated" or "deactivated" value.

In the context of energy savings, the UPnP forum has defined the so-called "Energy Management" profile in the specification "EnergyManagement for UPnP 1.0" of Aug. 30, 2013 which enables devices to publish the list of their network interfaces (name, description, physical address, network address, type, etc.) and in particular the status of the interfaces (active, deactivated without automatic wakeup, deactivated with periodic wakeup, etc.) and the wakeup scheme to be used to release them from a sleeping state.

An example of a description table for one or more devices of the network and their interfaces is provided hereinbelow in the context of the "Energy Management" UPnP standard; the PLC plug is represented in the XML (from the English "eXtended Markup Language") description syntax, assuming it to have a Bluetooth LE interface.

Example of Description of a PLC Plug

```
<?xml version="1.0" encoding="UTF-8"?>
<NetworkInterfaceInfo xsi:schemaLocation="urn:schemas-upnp-org:lp:emNetworkInterfaceInfo
http://www.upnp.org/schemas/lp/emNetworkInterfaceInfo.xsd" xmlns="urn:schemas-upnp-
org:lp:em
NetworkInterfaceInfo" xmlns:xsi="http://www.w3.org/2001/XMLSchema-instance">
    <DeviceInterface>
        <DeviceUUID>uuid:00000000-0000-1010-8000-4424991A912</DeviceUUID>
        <FriendlyName>PLC1 plug</FriendlyName>
        <NetworkInterface>
            <SystemName>ble0</SystemName>
            <Description>Bluetooth LE</Description>
            <MacAddress>54:42:49:91:A9:12</MacAddress>
            <InterfaceType>BLE</InterfaceType>
            <NetworkInterfaceMode>BLE-down-with-UPnPWakeOn
            </NetworkInterfaceMode>
            <MaxWakeOnDelay>5</MaxWakeOnDelay>
        </NetworkInterface>
```

```
</DeviceInterface>
</NetworkInterfaceInfo>
```

This example file comprises a list of an interface (DeviceInterface), described between an opening tag <NetworkInterface> and a closing tag </NetworkInterface>.

The interface is of Bluetooth LE type (<Description>Bluetooth LE</Description>). It is inactive and activatable by a new UPnP message called "BLE-down-with-UPnPWakeOn". This interface is awoken upon reception of a message "X_WakeOn" on the IP interface.

The XML syntax of the file representative of the interfaces of the plug is globally in accordance with the "Energy Management" UPnP specification mentioned above, except as regards the following two elements:
- the "InterfaceType" tag makes it possible to specify a low-consumption interface, in our example of Bluetooth LE type;
- the "NetworkInterfaceMode" tag makes it possible to specify that an interface is deactivatable ("BLE-up-with-UPnPStandby") by a new UPnP message called "X_Standby", a possible syntax of which is proposed hereinbelow, or activatable ("BLE-down-with-UPnPWakeOn") via the message "X_WakeOn".

Example of Syntax for the Message X_Standby

```
POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:EnergyManagement:1#X_Standby"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:X_Standby xmlns:u=
"urn:schemas-upnp-org:service:EnergyManagement:1">
<NetworkInterfaceSystemName>ble0</NetworkInterfaceSystemName>
</u:X_Standby>
</s:Body>
</s:Envelope>
```

Example of Syntax for the Message X_WakeOn

```
POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:EnergyManagement:1#X_WakeOn"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:X_WakeOn xmlns:u=
"urn:schemas-upnp-org:service:EnergyManagement:1">
<NetworkInterfaceSystemName>ble0</NetworkInterfaceSystemName>
</u:X_WakeOn>
</s:Body>
</s:Envelope>
```

It will be noted that these XML data constitute only an example of description data and that the invention can also apply to description data in accordance with another standard, such as the COAP (for "Constrained Application Protocol") protocol, the Alljoyn protocol defined by the Alliance Allseen.

In a particular embodiment, the PLC plugs 21, 24 are also designed to communicate on a second radio access network and each comprise a second radio access module according to a second radio access technology, such as WiFi (for "Wireless Fidelity") according to IEEE standard 802.11 "Wireless LAN Medium Access Control (MAC) and Physical Layer (PHY) Specifications" (802.11a/b/g/n/ac). In this case, the PLC plugs 21, 24 also have a role of extending the WiFi radio access network ("WiFi extender" in English). In a variant of this particular embodiment, the second radio access modules of the PLC plugs 21, 24 are activatable and deactivatable remotely by the access gateway 20 for example by a UPnP message "X_WakeOn" or "X_Standby". An activation state is associated with each second radio access module and can take an "activated" or "deactivated" value. The XML syntax of the file representative of the interfaces of the plug then comprises an additional interface (DeviceInterface), described between an opening tag <NetworkInterface> and a closing tag </NetworkInterface>. The interface is of WiFi type (<Description>Wi-Fi</Description>). It is inactive and activatable by a new UPnP message called "IP-down-with-UPnPWakeOn". This interface is awoken upon reception of a message "X_WakeOn" on the IP interface. It is deactivatable ("IP-up-with-UPnPStandby") by the new UPnP message called "X_Standby". The intelligent telephone 22 is situated for example in FIG. 1 in the area of WiFi coverage of the PLC plug 21.

Of course the access gateway 20 can also have a radio access module of Wi-Fi type. It then offers access to the wide area communication network 1 to devices situated in a radio coverage area (not represented in FIG. 1). The access gateway 20 thus communicates with devices which are located in its radio coverage area by way of a wireless connection.

It is recalled here that the local area network represented in FIG. 1 corresponds to an exemplary embodiment. No limitation is attached to the number of relay devices, of user devices, of peripheral devices, nor to the types of these devices.

Figure 2A:
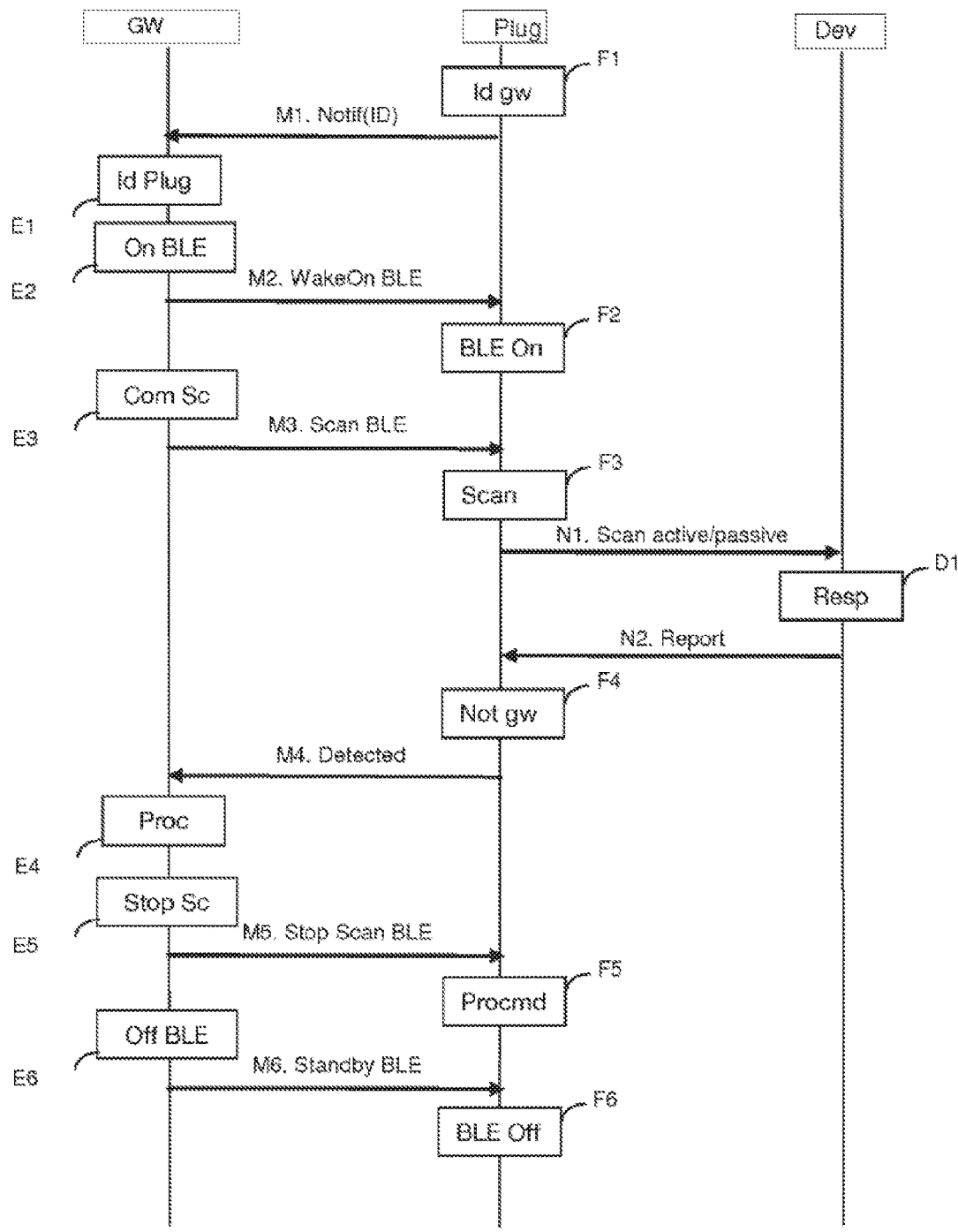
FIG. 2a illustrates steps of a method for determining a presence according to a particular embodiment.

We shall now describe, in conjunction with FIG. 2a, the technique, implemented by the access gateway 20 in collaboration with one of the relay devices 21, 24, for determining a presence of a peripheral device in a service area of a local area network in particular embodiments. The steps are described subsequently for the PLC plug 21 as a relay device. Of course these steps are also implemented for the PLC plug 24.

In the initial state, the first radio access module of the relay device 21 is in a "deactivated" state of activation, that is to say turned off or placed on standby. It is recalled here that this first radio access module corresponds to a BLE module.

In a step F1, the relay device 21 advertises its presence on the local area network by broadcasting a notification message M1-Notif. The message M1-Notif comprises an identifier of the relay device. The message M1 corresponds for example to an SSDP (for "Simple Service Discovery Protocol") protocol message NOTIFY "ssdp:alive". The SSDP protocol is defined by the IETF in a document draft-cai-ssdp-v1-03.txt "Simple Service Discovery Protocol/1.0 Operating without an Arbiter" of October 1999. It makes it possible to discover services offered on a network and in particular the energy management service "urn:schemas-upnp-org:service:EnergyManagement:1" and a BLE discovery service called "urn:schemas-upnp-org:service:blediscovery:1". The identifier of the relay device corresponds for example to a unique universal identifier UUID (for "Universally Unique Identifier").

Examples of Notification Message Dispatched by the Relay Device to Publish the Presence of the EnergyManagement and Blediscovery Services NOTIFY*HTTP/1.1
HOST: 239.255.255.250:1900
CACHE-CONTROL: max-age=seconds until advertisement expires
LOCATION: URL for UPnP description for root device
NT: urn:schemas-upnp-org:service:EnergyManagement:1
NTS: ssdp:alive
SERVER: OS/version UPnP/1.0 product/version
USN: advertisement UUID
NOTIFY*HTTP/1.1
HOST: 239.255.255.250:1900
CACHE-CONTROL: max-age=seconds until advertisement expires
LOCATION: URL for UPnP description for root device
NT: urn:schemas-upnp-org:service:blediscovery:1
NTS: ssdp:alive
SERVER: OS/version UNP/1.0 product/version
USN: advertisement UUID In a step E1, the access gateway 20 receives the notification message N1 originating from the relay device 21. The access gateway 20 is thus informed of the services and of the relay devices which are present in the local area network.

Example of Message Enabling the Access Gateway to Detect the Presence of the Blediscovery Service M-SEARCH*HTTP/1.1
HOST: 239.255.255.250:1900
MAN: "ssdp:discover"
MX: seconds to delay response
ST: urn:schemas-upnp-org:service:blediscovery:1

In a step E2, the access gateway 20 commands an activation of the BLE radio access module of the relay device 21, that is to say bringing it into operation. This bringing into operation can correspond to exiting a sleeping state or else to a powering up of the module. The state of activation of the module is then "activated". This command is performed by dispatching a message M2-WakeOn BLE. The message M2 corresponds for example to the message X_WakeOn defined previously in an Energy Management UPnP context.

This command message M2 is received by the relay device 21 in a step F2 and the latter then activates its BLE radio access module.

In a step E3, the access gateway 20 commands the relay device 21 so that the latter executes a listening for access frequencies of the BLE radio access network. This listening for frequencies is generally known by the term "scan" and makes it possible to detect the presence of peripheral devices. A command message M3-Scan BLE is transmitted by the access gateway 20 to the relay device 21. The message M3 corresponds for example to a UPnP message X_StartBLEScan.

Example of Syntax for the Message X_StartBLEScan

POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:blediscovery:1#X_StartBLEScan"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:X_StartBLEScan xmlns:u=
"urn:schemas-upnp-org:service:blediscovery:1">
<NetworkInterfaceSystemName>ble0</NetworkInterfaceSystemName>
</u:X_StartBLEScan>
</s:Body>
</s:Envelope>

In a particular embodiment, the message M3 comprises a first parameter d1 indicating a duration for which this frequency listening must be performed. In a particular embodiment alternative to or cumulative with the previous embodiment, the message M3 comprises a second temporal parameter d2 indicating the frequency at which this listening for frequencies must be performed. Thus, the access gateway 20 can command a listening for frequencies of d1 seconds every d2 seconds.

The access gateway 20 can thus command the listenings for BLE frequencies implemented by the relay device 21. This makes it possible to limit the energy consumption of the relay device 21. This frequency listening command E3 can be triggered in a regular manner by the access gateway 20. It can also be triggered following reception of an enquiry for obtaining a presence data item relating to a peripheral device. This enquiry can be sent by a device accessing the access gateway 20 on the basis of the wide area communication network or else of the local area network 2.

It is stressed here that the access gateway 20 can command both PLC plugs 21, 24 to listen for frequencies simultaneously or successively. It is also possible for just one of the two PLC plugs 21, 24 to be commanded to listen for frequencies for example as a function of the last location of the peripheral device, as a function of a time where this step is implemented.

In a step F3, the relay device 21 receives the command message M3 and if appropriate the associated temporal parameters and starts a listening for BLE frequencies. This listening for frequencies can be active, with a dispatching of a message N1 invoking the peripheral devices so that they signal themselves ("LE Set Scan Enable Command" defined in the specifications document "BLUETOOTH SPECIFICATION Version 4.1"), or passive.

In a step D1, the peripheral device 23 detects that it must signal itself to the relay device and transmits a message N2-Report on one of the frequencies dedicated to this listening. This message N2 corresponds to an advertisement message "LE Advertising Report", also defined in this Bluetooth specifications document, comprising in particular the name of the peripheral device ("Local Name"), an address, for example the MAC address, and a data item representative of an RSSI ("Received Signal Strength Indication") radio signal. When frequency listening is active, this message N2 comprises an "Event_Type" element equal to "Scan Response". In the converse case (passive listening), this message N2 comprises an "Event_Type" element equal to "connectable (undirected/directed) advertising".

The name of the peripheral device "Local Name" can take the values "Shortened Local Name" and "Complete Local Name". It makes it possible to identify the peripheral device simply. When it is not present in the message N2, it can be obtained in a later exchange.

This advertisement message N2 is received by the relay device 21 in a step F4. Still in this step F4, following reception of the advertisement message N2, the relay device 21 transmits a notification M4-Detected of detection of the peripheral device 23 to the gateway 20. The notification of detection M4 comprises for example the name of the peripheral device detected and/or the address of the peripheral device detected. In a particular embodiment, the notification of detection M4 is a message of the GENA (for "Generic Event Notification Architecture") protocol layer. The GENA protocol defined in the document of the IETF "draft-cohen-gena-p-base-01.txt" makes it possible in a UPnP network to advertise events through a subscription mechanism.

Example of GENA Notification

```
NOTIFY delivery path HTTP/1.1
HOST: delivery host:delivery port
CONTENT-TYPE: text/xml
CONTENT-LENGTH: Bytes in body
NT: upnp:event
NTS: upnp:propchange
SID: uuid:subscription-UUID
SEQ: event key
<?xml version="1.0"?>
<e:propertyset xmlns:e="urn:schemas-upnp-org:event-1-0">
    <e:property>
       <CompleteLocalName>Flex</CompleteLocalName>
       <MACAddress>F8:C7:2D:CB:0A:22</MACAddress>
       <MACAddressType>RANDOM</MACAddressType>
       <RSSI>−58</RSSI>
    </e:property>
</e:propertyset>
```

In another particular embodiment, the notification of detection M4 is an Alljoyn protocol message.

This notification of detection M4 is received by the access gateway 20 in a step E4. The peripheral device 23 is then identified as present in the service area of the local area network. This item of information in respect of presence of the peripheral device 23 is stored in a storage memory comprising a list of peripheral devices L. The access gateway 20 can also establish a more precise location of this peripheral device 23 as a function of the location of the relay device 21. This location is also stored in the list L. On account of the central role of the access gateway 20 and of its connection to the Internet communication network 1, it is then possible for a user outside the local area network to access this item of information in respect of presence of the peripheral device 23. By way of illustrative example, when the peripheral device 23 corresponds to a connected watch on a child's wrist, an adult user can take cognizance of the fact that the child has returned home (that is to say to the service area of the local area network).

In a step E5, the access gateway 20 commands the relay device 21 so that the latter stops the execution of listening for access frequencies for the BLE radio access network. A command message M5-Stop Scan BLE is transmitted by the access gateway 20 to the relay device 21. The message M5 corresponds for example to a UPnP message X_StopBLEScan.

Example of Syntax for the Message X_StopBLEScan

```
POST /controlURL URL HTTP/1.1
HOST: 192.168.1.10:52000
CONTENT-LENGTH: bytes in body
CONTENT-TYPE: text/xml; charset="utf-8"
SOAPACTION:
"urn:schemas-upnp-org:service:blediscovery:1#X_StopBLEScan"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:X_StopBLEScan xmlns:u=
"urn:schemas-upnp-org:service:blediscovery:1">
<NetworkInterfaceSystemName>ble0</NetworkInterfaceSystemName>
</u:X_StopBLEScan>
</s:Body>
</s:Envelope>
```

In a step F5, the relay device 21 receives the command message M5 and stops listening for BLE frequencies. This makes it possible to limit the energy consumption of the relay device 21 as well as the consumption on the peripheral devices which no longer have to respond to discovery enquiries.

In a step E6, the access gateway 20 commands a deactivation of the BLE radio access module of the relay device 21, that is to say placing it out of operation. This placing out of operation can correspond to entering a sleeping state or else to powering down of the module. The state of activation of the module is then "deactivated". This command is performed by dispatching a message M6-Standby BLE. The message M6 corresponds for example to the message X_Standby defined previously in an Energy Management UPnP context.

This command message M6 is received by the relay device 21 in a step F6 and the latter then deactivates its BLE radio access module. This makes it possible to limit the energy consumption of the relay device 21.

The steps described previously rely on the implementation of a protocol between the access gateway implementing the IP protocol and the PLC plug also implementing the IP protocol and the BLE protocol. The protocol defined makes it possible in particular by way of the IP interface:
  to command the activation or the deactivation of a BLE radio access module;
  to command the starting or the stopping of a listening for frequencies by the BLE radio access module:
  to obtain a notification of presence of a peripheral device following reception of an advertisement message by way of the BLE radio access module.

The solution proposed here consists in implementing a protocol between a conventional IP device of the Livebox type and one or more devices implementing the BLE protocol and the IP protocol (in our case PLC plugs).

The embodiment has been described in a case where the presence of the peripheral device 23 is detected in step E4. The reception of a notification of presence M4 is supervised by a timeout. When this timeout expires, the access gateway 20 updates the list L of the peripheral devices present by adding those which have advertised themselves, deleting those which have not advertised themselves, modifying their location in case of change.

In a particular embodiment, more precise location of the peripheral device is carried out by the access gateway 20. It is recalled that in step F4, the relay device 21 receives the advertisement message N2-Report originating from the peripheral device 23. This message N2 comprises in particular a data item representative of an RSSI ("Received Signal Strength Indication") radio signal. This advertisement message N2 is received by the relay device 21 in step F4. Still in this step F4, the relay device 21 transmits the notification M4-Detected of detection of the peripheral device 23 to the gateway 20. The notification of detection M4 then also comprises the data item representative of an RSSI radio signal. Upon reception of this notification M4, the access gateway 20 can then determine on the basis of the RSSI data item a distance between the peripheral device 23 and the relay device 21. On the basis of this distance, the access gateway 20 can determine whether the peripheral device 23 is very close to (less than 0.5 m), close to (of the order of 1 to 3 m) or far from (several meters) the relay device 21. The access gateway 20 can also, when several relay devices have detected a peripheral device, determine which one the peripheral device is closest to.

In another particular embodiment, the advertisement message N2 received by the relay device 21 furthermore comprises an address in the local area network identifying a master device 22 controlling the peripheral device 23. This address corresponds for example to the MAC address of the master device 22. This advertisement message N2 is received by the relay device 21 in step F4. Still in this step F4, the relay device 21 transmits the notification M4-Detected of detection of the peripheral device 23 to the gateway 20. The notification of detection M4 then also comprises the address in the local area network identifying the master device 22 controlling the peripheral device 23. Following reception of this notification M4, the access gateway 20 can associate the detection of the peripheral device 23 with the presence of the master device 22, which is moreover known at the IP level, that is to say the local area network level. By virtue of this association, an action can be executed by one of the devices of the local area network. By way of illustrative example, when the relay device 21 also plays a role of extending the WiFi network ("WiFi extender") and therefore has a second radio access module of WiFi type, the access gateway 20 can command an activation of this WiFi radio access module so that the master device 22 may connect to the local area network by way of the relay device 21. This WiFi interface is awoken upon the reception by the PLC plug 21 of a message "X_WakeOn" on the IP interface, such as described previously. The master device 22 can then access the local area network by establishing a connection with the relay device 21.

In another particular embodiment, following a detection of the presence of the peripheral device 23 in the service area, the access gateway 20 triggers the execution of an action in the local area network. By way of illustrative examples of actions, this may entail bringing into operation or placing out of operation a WiFi radio access module of the access gateway 20, bringing into operation or placing out of operation the TV decoder 27, transferring a stream from a main TV device to a secondary TV device for example situated in a bedroom, to trigger the heating, to start the dishwasher etc.

These actions can be configured in advance in a table associating a presence of a peripheral device with an action. Alternatively, the access gateway 20 can implement a learning phase to set up this table, by performing correlations between presence detection events occurring at a given time and actions triggered by the user or users located in the service area of the local area network.

Figure 2B:
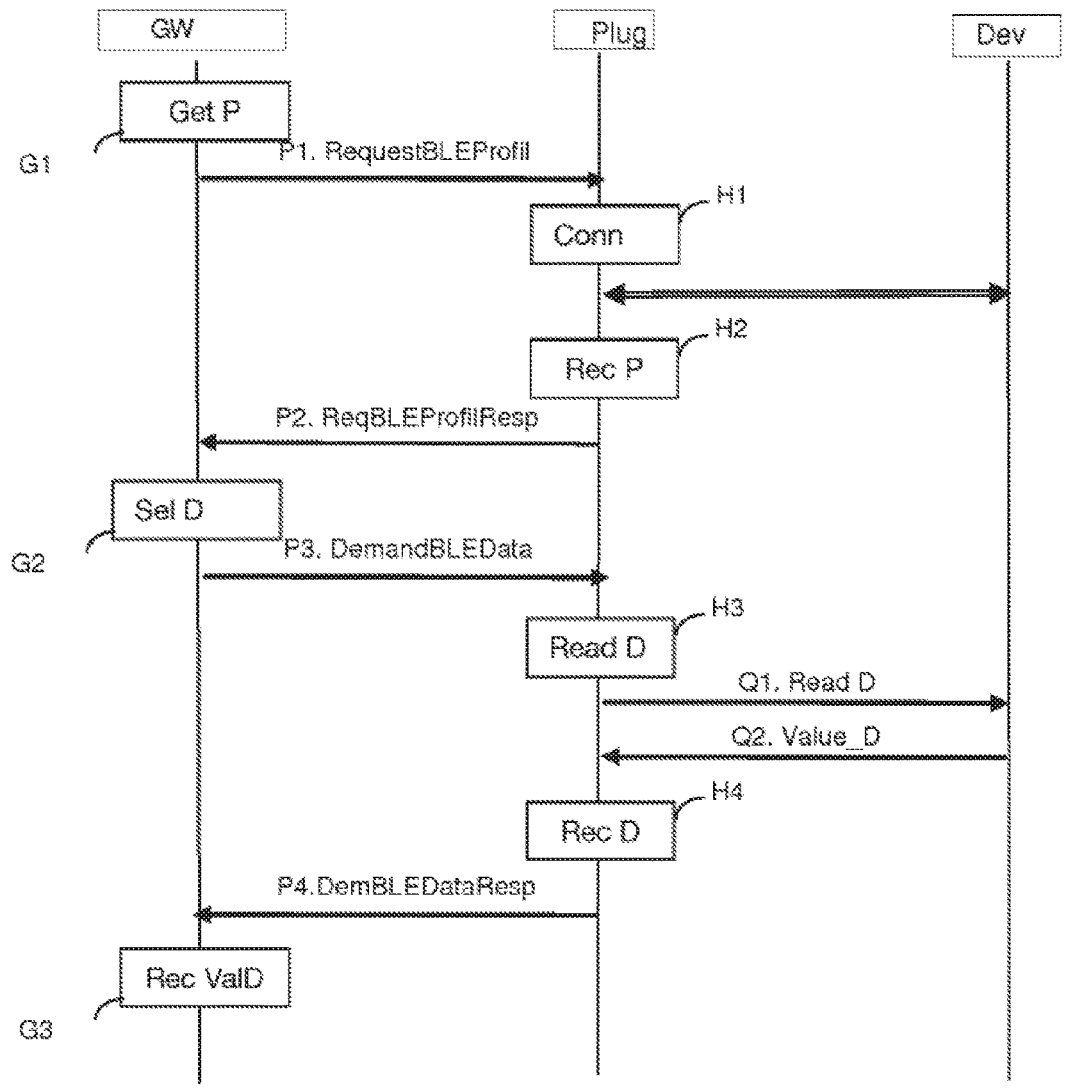
FIG. 2b illustrates steps of obtaining a data item, representative of a value taken by a characteristic, managed by a peripheral device present according to a particular embodiment.

In another embodiment, illustrated by FIG. 2*b*, the access gateway 20 and the relay device 21, having detected a peripheral device 23 in the service area, implement a phase of obtaining one or more values of characteristics associated with a service offered by the peripheral device. The messages exchanged between the access gateway 20 and the relay device 21 comply with the UPnP protocol. The messages exchanged between the relay device 21 and the peripheral device 23 comply with the BLE protocol.

In the initial state, the first radio access module of the relay device 21 is in an "activated" state of activation, that is to say brought into operation. The scheme for switching it from a "deactivated" to "activated" state of activation has been described previously and is implemented if necessary. Moreover, when these steps are performed subsequent to the detection of the peripheral device 23, step E6 previously described might not be executed so as to keep the first radio access module brought into operation.

In a step G1, the access gateway 20 dispatches a Request-BLEProfile command P1 to the relay device 21, commanding the relay device 21 to connect to the peripheral device 23 and to obtain a GATT profile ("Generic Attribute Profile"). The peripheral device 23 is identified by its address, for example its MAC address, obtained in step F4. It is recalled here that the GATT profile is organized hierarchically into sections, called services, which group together data called characteristics. A characteristic can correspond for example to the battery level, to the degree of moisture, to the degree of luminosity, to the number of steps performed by a user, etc. A characteristic is identified by a unique universal identifier UUID (for "Universally Unique Identifier"). Such a RequestBLEProfile request is for example a message of the SOAP (for "Simple Object Access Protocol") protocol layer in a UPnP network and forms part of the BLE discovery service "blediscovery" described previously. The SOAP protocol makes it possible in a UPnP network to invoke actions.

Example of Request Message

```
POST /controlURL URL HTTP/1.1
HOST: 192.168.1.10:52000
CONTENT-LENGTH: bytes in body
CONTENT-TYPE: text/xml; charset="utf-8"
SOAPACT1ON:
"urn:schemas-upnp-org:service:blediscovery:1#RequestBLEProfile"
<?xml version="1.0"?>
<s:Envelope xmlns:s="http://schemas.xmlsoap.org/soap/envelope/"
s:encodingStyle="http://schemas:xmlsoap.org/soap/encoding/">
<s:Body>
<u:RequestBLEProfile xmlns:u=
"urn:schemas-upnp-org:service:blediscovery:1">
  <CompleteLocalName>Flex</CompleteLocalName>
  <MACAddress>F8:C7:2D:CB:0A:22</MACAddress>
  <MACAddressType>RANDOM</MACAddressType>
</u:RequestBLEProfile>
</s:Body>
</s:Envelope>
```

This command P1 is received by the relay device 21 in a step H1. The relay device 21 then establishes a connection with the peripheral device 23 identified according to the mechanism defined by Bluetooth LE. This connection is symbolized in FIG. 2*b* by a double arrow. Next, in a step H2, the relay device 21 receives the GATT profile of the peripheral device 23 and transfers it to the access gateway 20 in a response message P2 RequestBLEProfileResponse.

The GATT profile is received by the access gateway 20 in a step G2. Such a response RequestBLEProfileResponse complies for example with the UPnP protocol and forms part of the BLE discovery service "blediscovery" described previously.

Example of Response Message for a Blood Pressure Sensor

```
HTTP/1.1 200 OK
CONTENT-LENGTH: bytes in body
CONTENT-TYPE: text/xml; charset="utf-8"
DATE: when response was generated
EXT:
SERVER: OS/version UPnP/1.0 product/version
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:RequestBLEProfileResponse xmlns:u="urn:schemas-upnp-org:service:blediscovery:1">
<Profile xsi:noNamespaceSchemaLocation="http://schemas.bluetooth.org/Documents/profile.xsd"
xmlns:xsi="http://www.w3.org/2001/XMLSchema-instance"
type="org.bluetooth.profile.blood_pressure" name="Blood Pressure">
    <InformativeText>
        <Abstract> Abstract </Abstract>
        <Summary> Summary </Summary>
    </InformativeText>
    <Role name="Blood Pressure Sensor">
    <Service type="org.bluetooth.service.blood_pressure"/>
    <Service type="org.bluetooth.service.device_information">
        <Characteristic>
            <Type>"org.bluetooth.characteristic.manufacturer_name_string"</Type>
            <Uuid>2a29</Uuid>
        </Characteristic>
        <Characteristic>
            <Type>"org.bluetooth.characteristic.model_number_string"</Type>
            <Uuid>2a24</Uuid>
        </Characteristic>
        <Characteristic>
            <Type>"org.bluetooth:characteristic.system_id"</Type>
            <Uuid>2a23</Uuid>
        </Characteristic>
    </Service>
</Profile>
</u:RequestBLEProfileResponse>
</s:Body>
</s:Envelope>
```

Still in this step G2, a characteristic is selected on the basis of the GATT profile received. This selection is for example configured as a function of the type of peripheral device. It can also be performed by an application executing on the access gateway 20 or else a remote device accessing the access gateway 20.

A command P3 DemandBLEData is then dispatched from the access gateway 20 to the relay device 21, commanding the latter to obtain a value of the selected characteristic identified by its unique universal identifier. Such a DemandBLEData request complies for example with the UPnP protocol and forms part of the BLE discovery service "blediscovery" described previously.

Example of Characteristic Request Message (Battery Level)

```
POST /controlURL URL HTTP/1.1
HOST: 192.168.1.10:52000
```

-continued

```
CONTENT-LENGTH: bytes in body
CONTENT-TYPE: text/xml; charset="utf-8"
SOAPACTION:
"urn:schemas-upnp-org:service:blediscovery:1#DemandBLEData"
<?xml version="1.0"?>
<s:Envelope xmlns:s="http://schemas.xmlsoap.org/soap/envelope/"
s:encodingStyle="http://schemas.xmlsoap.org/soap/encoding/">
<s:Body>
<u:DemandBLEData xmlns:u=
```

-continued

```
"urn:schemas-upnp-org:service:blediscovery:1">
    <CompleteLocalName>Flex</CompleteLocalName>
    <MACAddress>F8:C7:2D:CB:0A:22</MACAddress>
    <MACAddressType>RANDOM</MACAddressType>
    <Characteristic>2a19</Characteristic>
</u:DemandBLEData>
</s:Body>
</s:Envelope>
```

This command P3 is received by the relay device 21 in a step H3. The relay device 21 then dispatches a read request Q1 ("READ") in respect of the value of this characteristic.

In the course of a step H4, the relay device 21 receives this value in a message Q2 and transfers it to the access gateway 20 in a message P4 DemandBLEDataResponse.

The message P4 is received by the access gateway 20 in a step G3.

Thus, at any instant, the access gateway 20 can obtain a value of characteristic measured or managed by the peripheral device.

In a variant to this other embodiment, the implementation of step G1 is triggered by the reception of a RequestBLEProfile request originating from a device of the local area network.

Optionally, the access gateway 20 can implement a control of the rights of access of the requesting device to the GATT profile and to the characteristics of the peripheral device 23 before the command P1 is dispatched to the relay device 21.

Upon reception of the GATT profile in step G2, the access gateway 20 transmits this profile to the device of the local area network that required it in a response RequestBLEProfileResponse.

The latter device then selects a characteristic on the basis of the profile and transmits the request to read the characteristic to the access gateway 20. The access gateway 20 then transmits the value of the characteristic received in step G3 to the device that requested it.

The various embodiments have been described with various steps making it possible to optimize the energy consumption of the relay devices 21, 24. It is also possible to provide for other modes not offering this optimization. In a first variant, step E5 aimed at stopping the frequency listening is not implemented. The relay device 21 then performs frequency listening permanently as a function of the temporal parameters defined by the access gateway 20. In a second variant, step E6 of deactivating the BLE radio access module is not implemented. The BLE radio access network exists permanently at the level of the relay device 21.

The various embodiments have been described with the aid of UPnP mechanisms and protocol. No limitation is attached to the use of the UPnP protocol. The various embodiments can also be implemented with a binary oriented protocol or else with the Alljoyn protocol. The binary oriented protocol is a communication protocol which transmits data streams as a set of bits without semantics and relies on a messaging defined between two devices, a message comprising a type of message and parameters. This exhibits the advantage of limiting the bandwidth required for the implementation of the method between two devices.

By way of illustration, a case of use is described. Fabrice uses a connected bracelet of the FitBit Flex type to count the number of steps that he takes each day and to measure the quality of his sleep at night. His FitBit bracelet customarily communicates with the FitBit application on his smartphone to display to Fabrice the number of steps performed and an estimation of the calories expended. At home, Fabrice also has an access gateway and PLC plugs that he has placed in his lounge and his bedroom. By way of the PLC plugs, the access gateway is capable of detecting the presence and the absence of Fabrice's bracelet and to locate the room that Fabrice is in. Moreover, in contradistinction to Fabrice's smartphone which regularly cuts off its WiFi radio access module so as to save its battery, Fabrice's bracelet permanently advertises its presence under Bluetooth LE. The access gateway is therefore capable of associating the presence of the bracelet with the presence of Fabrice. The access gateway can also, by virtue of a learning algorithm or by user configuration, deactivate the "WiFi Extender" function of the PLC plugs and the WiFi module of the access gateway when the latter no longer detects the presence of the bracelet. It is also capable of placing the digital TV decoder on deep standby if it detects a prolonged absence of the connected watch from the lounge. It is then also possible during a phase of obtaining the data to obtain the number of steps performed and an estimation of the calories expended.

Figure 3:
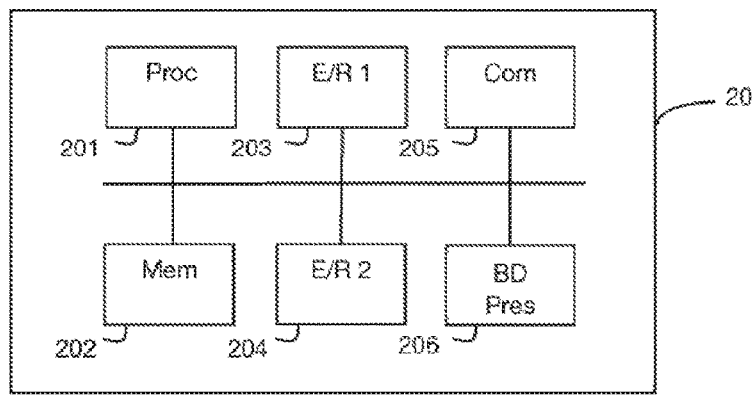
FIG. 3 represents an access gateway according to a particular embodiment.

We shall now describe an access gateway 20 in a particular embodiment with reference to FIG. 3, Such an access gateway enables at least one device of a local area network to access a wide area communication network and is designed to cooperate with a relay device so as to determine a presence of a peripheral device 23, 26 in a service area of the local area network. It comprises in particular:

- a memory area 202, designed to store a program which comprises code instructions for implementing the steps of the method of determining presence such as described previously;
- a processor 201 for executing code instructions of software modules;
- a send/receive module 203, designed to dispatch data to the relay device and to receive same from the relay device;
- an access module 204 for accessing the wide area communication network;
- a command module 205, designed to dispatch a command to the relay device;
- a memory area 206, designed to store a list of peripheral devices that are present in the service area of the local area network.

It is stressed here that the access gateway 20 also comprises other processing modules, not represented in FIG. 3, designed to implement the various functions of an access gateway.

The send/receive module 203 is for example an Ethernet interface module. The send/receive module 203 is in particular designed to receive from a relay device a notification of detection of a peripheral device, sent by the relay device following reception of an advertisement message originating from the peripheral device. This peripheral device is then identified as present in the service area of the local area network and this item of information is stored in the memory area 306, as described previously in conjunction with FIG. 2a.

The command module 205 is in particular designed to command the relay device to execute a listening for access frequencies of a radio access network.

In a particular embodiment, the command module 205 is furthermore designed to command an activation of a radio access module of the relay device prior to the dispatching of the listening command and to command a deactivation of this radio access module once listening has terminated.

In a particular embodiment, the command module 205 is furthermore designed to trigger an execution of an action in the local area network. This triggering follows for example the detection of the presence of a peripheral device in the service area. In a particular embodiment, the action is triggered following the reception by the send/receive module 203 of a notification of detection comprising an address in the local area network identifying a master device controlling the peripheral device.

In a particular embodiment, the command module 205 is furthermore designed to command the relay device 21 to connect to the peripheral device 23 and to obtain a GATT profile, to select a characteristic on the basis of the GATT profile received and to command an obtaining of a value of the selected characteristic identified by its unique universal identifier. The send/receive module 203 is then designed to receive from a relay device the GATT profile and the value of the selected characteristic.

Figure 4:
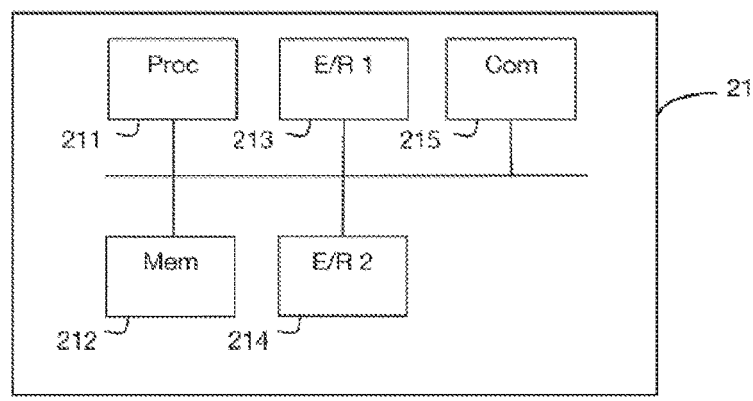
FIG. 4 represents a relay device according to a particular embodiment.

We shall now describe a relay device 21, 24 in a particular embodiment with reference to FIG. 4. Such a relay device is designed to cooperate with an access gateway so as to determine a presence of a peripheral device 23, 26 in a service area of the local area network. It comprises in particular:

a memory area 212, designed to store a program which comprises code instructions for implementing the steps of the method for determining presence such as described previously;

a processor 211 for executing code instructions of software modules;

a send/receive module 213, designed to dispatch data to the access gateway and to receive same from the latter;

a radio access module 214;

a processing module 215, designed to execute a command received from the access gateway.

The radio access module 214 is designed to communicate on a radio access network.

The send/receive module 213 is of the same type as the corresponding module 203 of the access gateway. It is in particular designed to receive from the access gateway a command to execute a listening for access frequencies of the radio access network. The send/receive module 213 is furthermore designed to dispatch to the access gateway a notification of detection of the peripheral device following the reception by the radio access module 214 of an advertisement message.

The radio access module 214 is designed to execute a listening for access frequencies of the radio access network on command of the processing module and to receive an advertisement message originating from a peripheral device.

It is stressed here that the relay device 21 also comprises other interface modules, not represented in FIG. 4. This is for example a send/receive module, designed to communicate with another relay device 24.

In a particular embodiment, the send/receive module 213 is furthermore designed for receiving a command to activate the radio access module 214 of the relay device or a command to deactivate this radio access module once listening has terminated.

In a particular embodiment, the send/receive module 213 is furthermore designed for receiving a command to connect to the peripheral device 23 and for receiving a command to obtain a value of a characteristic identified by its unique universal identifier. The radio access module 214 is then designed to connect with the peripheral device, to receive its GATT profile, to transmit to the peripheral device an order to read a value of a characteristic identified by its unique universal identifier and obtain this value in return.

The technique for determining a presence of a peripheral device is implemented by means of software components and/or hardware components. In this regard, the term "module" can correspond in this document equally to a software component, or to a hardware component or to a set of hardware and/or software components, able to implement a function or a set of functions, according to what is described previously in respect of the module concerned.

A software component corresponds to one or more computer programs, one or more subprograms of a program, or more generally to any element of a program or of an item of software. Such a software component is stored in memory and then loaded and executed by a data processor of a physical entity and is liable to access the hardware resources of this physical entity (memories, recording media, communication buses, electronic input/output cards, user interfaces, etc.).

In the same manner, a hardware component corresponds to any element of a hardware set. It may or may not be a programmable hardware component, with or without integrated processor for the execution of software. It is for example an integrated circuit, a chip card, an electronic card for the execution of firmware, etc.

In a particular embodiment, the modules 203, 204, 205 are designed to implement the determining method described previously. This preferably entails a software module comprising software instructions for executing the steps of the determining method described previously, and which are implemented by an access gateway. The invention therefore also relates to:

a program for an access gateway, comprising program code instructions intended to control the execution of the steps of the determining method described previously, when said program is executed by this access gateway;

a recording medium readable by an access gateway on which the program for a gateway is recorded.

In a particular embodiment, the modules 213, 214, 215 are designed to implement the determining method described previously. It preferably entails a software module comprising software instructions for executing the steps of the determining method described previously, and which are implemented by a relay device. The invention therefore also relates to:

a program for a relay device, comprising program code instructions intended to control the execution of the steps of the determining method described previously, when said program is executed by this relay device;

a recording medium readable by a relay device on which the program for a relay device is recorded.

The software modules can be stored in or transmitted by a data medium. The latter can be a hardware storage medium, for example a CD-ROM, a magnetic recording means, for example a magnetic diskette or a hard disk. Moreover, the data medium can be a transmission medium such as an electrical, optical or radio signal, which can be conveyed via an electrical or optical cable, by radio or by other means. The program code instructions can be in particular downloaded from a network of Internet type.

Alternatively, the data medium can be an integrated circuit in which the program is incorporated, the circuit being adapted to execute or to be used in the execution of the determining method described previously.

The invention also relates to a system for determining a presence of a peripheral device 23, 26 in a service area of a local area network 2, this local area network comprising an access gateway 20 such as described previously and at least one relay device 21, 24 such as described previously.

The invention claimed is:

1. A method for determining a presence of a peripheral device in a service area of a local area network, said local area network comprising an access gateway to a wide area network and at least one relay device, said gateway enabling access to the wide area network to said at least one relay device, said peripheral device and the at least one relay device being able to communicate with each other by way of a radio access network, distinct from the local area network, said method implemented by the gateway:

issuing a command on the local area network to said at least one relay device connected to the local area network, said command requesting an execution of a listening for access frequencies of the radio access network; and receiving on the local area network from said at least one relay device of a notification of detection of the peripheral device, sent by said at least one relay device subsequent to a reception of an advertisement message originating from the peripheral device, said peripheral device then being identified as present in the service area.

2. The method as claimed in claim 1, furthermore comprising issuing on the local area network a command to activate a radio access module of said at least one relay device prior to a dispatching of the command requesting an execution of a listening and commanding to deactivate said module once listening has terminated.

3. The method as claimed in claim 1, in which the advertisement message received by said at least one relay device comprises a data item which is representative of a radio signal received from said at least one relay device and which is dispatched to the gateway in association with the notification of detection.

4. The method as claimed in claim 1, in which the advertisement message received by said at least one relay device furthermore comprises an address in the local area network identifying a master device controlling the peripheral device.

5. The method as claimed in claim 1, comprising, following a detection of the presence of the peripheral device in the service area, executing an action in the local area network.

6. The method as claimed in claim 5, in which the advertisement message received by said at least one relay device furthermore comprises an address in the local area network identifying a master device controlling the peripheral device and the action corresponds to an activation of a second radio access module of said at least one relay device, to establish a connection with the master device.

7. The method as claimed in claim 1, furthermore comprising obtaining a value of a characteristic managed by the peripheral device present.

8. An access gateway enabling at least one device of a local area network to access a wide area network and designed to cooperate with a relay device belonging to the local area network so as to determine a presence of a peripheral device in a service area of the local area network, said gateway comprising:
   a processor; and
   a non-transitory computer-readable medium comprising instructions stored thereon, which when executed by the processor configure the access gateway to perform acts comprising:
      commanding on the local area network the relay device connected to the local area network to execute a listening for access frequencies of a radio access network, distinct from the local area network; and
      receiving on the local area network from said relay device a notification of detection of the peripheral device, sent by the relay device following reception of an advertisement message originating from the peripheral device, said peripheral device then being identified as present in the service area of the local area network.

9. A relay device in a local area network, designed to cooperate with an access gateway enabling the devices of the local area network to access a wide area network so as to determine a presence of a peripheral device in a service area of the local area network, said access gateway enabling access to the wide area network to said relay device, said relay device comprising:
   a processor; and
   a non-transitory computer-readable medium comprising instructions stored thereon, which when executed by the processor configure the relay device to perform acts comprising:
      receiving from the access gateway on the local area network a command to execute a listening for access frequencies of a radio access network, distinct from the local area network;
      executing by a radio access module the listening for access frequencies of the radio access network and receiving by said radio access module an advertisement message originating from the peripheral device; and
      sending to the access gateway on the local area network a notification of detection of the peripheral device following reception of the advertisement message.

10. A system for determining a presence of a peripheral device in a service area of a local area network, said local area network comprising
   an access gateway enabling at least one device of a local area network to access a wide area network and designed to cooperate with a relay device belonging to the local area network so as to determine a presence of a peripheral device in a service area of the local area network, said gateway comprising:
      a gateway processor; and
      a gateway non-transitory computer-readable medium comprising instructions stored thereon, which when executed by the processor configure the access gateway to perform acts comprising:
         commanding on the local area network the relay device connected to the local area network to execute a listening for access frequencies of a radio access network, distinct from the local area network;
         receiving on the local area network from said relay device a notification of detection of the peripheral device, sent by the relay device following reception of an advertisement message originating from the peripheral device, said peripheral device then being identified as present in the service area of the local area network; and
   said relay device designed to cooperate with the access gateway and comprising:
      a relay processor; and
      a relay non-transitory computer-readable medium comprising instructions stored thereon, which when executed by the processor configure the relay device to perform acts comprising:
         receiving from the access gateway on the local area network a command to execute the listening for access frequencies of the radio access network, distinct from the local area network;
         executing by a radio access module the listening for access frequencies of the radio access network and receiving by the radio access module an advertisement message originating from the peripheral device; and
         sending to the access gateway on the local area network a notification of detection of the peripheral device following reception of the advertisement message.

11. A non-transitory computer readable medium storing a program for a gateway, the program comprising program code instructions intended to control execution of steps of a determining method implemented by the gateway, when said program is executed by said gateway, the determining method for determining a presence of a peripheral device in a service area of a local area network, said local area network comprising an access gateway to a wide area network and at least one relay device, said gateway enabling access to the wide area network to said at least one relay device, said peripheral device and the at least one relay device being able to communicate with each other by way of a radio access network, distinct from the local area network, said method comprising the following steps implemented by the gateway:

issuing a command on the local area network to said at least one relay device connected to the local area network, said command requesting an execution of a listening for access frequencies of the radio access network, distinct from the local area network; and receiving on the local area network from said at least one relay device of a notification of detection of the peripheral device, sent by said at least one relay device subsequent to a reception of an advertisement message originating from the peripheral device, said peripheral device then being identified as present in the service area.

12. A non-transitory recording medium readable by a gateway and on which a program for the gateway is recorded, the program comprising program code instructions intended to control execution of steps of a determining method implemented by a gateway, when said program is executed by said gateway, the determining method for determining a presence of a peripheral device in a service area of a local area network, said local area network comprising an access gateway to a wide area network and at least one relay device, said gateway enabling access to the wide area network to said at least one relay device, said peripheral device and the at least one relay device being able to communicate with each other by way of a radio access network, distinct from the local area network, said method comprising the following steps implemented by the gateway:

commanding on the local area network said at least one relay device connected to the local area network, said command requesting an execution of a listening for access frequencies of the radio access network, distinct from the local area network; and receiving on the local area network from said at least one relay device of a notification of detection of the peripheral device, sent by said at least one relay device subsequent to a reception of an advertisement message originating from the peripheral device, said peripheral device then being identified as present in the service area.

13. The non-transitory computer readable medium as claimed in claim 11, wherein the method further comprises issuing on the local area network a command to activate a radio access module of said at least one relay device prior to a dispatching of the command requesting an execution of a listening and issuing a command to deactivate said module once listening has terminated.

14. The non-transitory computer readable medium as claimed in claim 11, in which the advertisement message received by said at least one relay device comprises a data item which is representative of a radio signal received from said at least one relay device and which is dispatched to the gateway in association with the notification of detection.

15. The non-transitory computer readable medium as claimed in claim 11, in which the advertisement message received by said at least one relay device furthermore comprises an address in the local area network identifying a master device controlling the peripheral device.

16. The non-transitory computer readable medium as claimed in claim 11, comprising, following a detection of the presence of the peripheral device in the service area, executing an action in the local area network.

17. The non-transitory computer readable medium as claimed in claim 16, in which the advertisement message received by said at least one relay device furthermore comprises an address in the local area network identifying a master device controlling the peripheral device and the action corresponds to an activation of a second radio access module of said at least one relay device to establish a connection with the master device.

18. The non-transitory computer readable medium as claimed in claim 11, wherein the method further comprises obtaining a value of a characteristic managed by the peripheral device present.

* * * * *